(12) United States Patent
Yamaura

(10) Patent No.: US 6,490,269 B1
(45) Date of Patent: Dec. 3, 2002

(54) OFDM SIGNAL GENERATION METHOD AND OFDM SIGNAL GENERATION APPARATUS

(75) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/357,795

(22) Filed: Jul. 20, 1999

(30) Foreign Application Priority Data

Jul. 22, 1998 (JP) .......................................... 10-206286

(51) Int. Cl.⁷ .................................................. H04J 1/00
(52) U.S. Cl. ........................ 370/343; 370/203; 370/210
(58) Field of Search ................................. 370/343, 203, 370/204, 205, 206, 207, 208, 209, 210, 211, 241, 242, 252, 465, 466

(56) References Cited

U.S. PATENT DOCUMENTS

| | | | | |
|---|---|---|---|---|
| 3,931,472 A | * | 1/1976 | Gill et al. ................... | 370/206 |
| 5,444,697 A | * | 8/1995 | Leung et al. ................ | 370/207 |
| 5,450,456 A | * | 9/1995 | Mueller ...................... | 370/203 |
| 5,602,835 A | * | 2/1997 | Seki et al. .................. | 370/206 |
| 5,682,376 A | * | 10/1997 | Hayashino et al. ......... | 370/206 |
| 5,726,978 A | * | 3/1998 | Frodigh et al. ............. | 370/252 |
| 5,732,113 A | * | 3/1998 | Schmidl et al. ............. | 375/354 |
| 5,796,814 A | * | 8/1998 | Brajal et al. ................ | 375/229 |
| 6,122,246 A | * | 9/2000 | Marchok et al. ............ | 370/206 |
| 6,134,445 A | * | 10/2000 | Gould et al. ........... | 379/433.04 |
| 6,201,785 B1 | * | 3/2001 | Fouche et al. .............. | 370/203 |
| 6,344,749 B1 | * | 2/2002 | Williams .................... | 324/620 |

* cited by examiner

Primary Examiner—Dwayne Bost
Assistant Examiner—Lewis West
(74) Attorney, Agent, or Firm—Jay H. Maioli

(57) ABSTRACT

It is made possible to favorably test the transmission state and so on by using an OFDM modulated signal. Time axis representation of predetermined input data is converted to frequency axis representation thereof at every predetermined unit by using inverse Fourier transform, and thereby an OFDM signal using a plurality of sub-carriers is generated. In addition, in response to a predetermined command, output of arbitrary sub-carriers included in the plurality of sub-carriers forming the OFDM signal is stopped.

6 Claims, 7 Drawing Sheets

OFDM SIGNAL GENERATION METHOD AND OFDM SIGNAL GENERATION APPARATUS

BACKGROUND OF THE INVENTION

1. Field of the Invention

The present invention relates to an OFDM signal generation method, and apparatus, for generating a signal subjected to Orthogonal Frequency Division Multiplexing hereafter referred to as OFDM) modulation, and in particular to a technique suitable for the case where a transmission system is tested by transmitting an OFDM signal.

2. Description of the Related Art

Heretofore, as one of modulation systems in the case where a comparatively large amount of digital data are sent by radio transmission or the like, an OFDM modulation has been put to practical use. The OFDM modulation system is a system for transmitting transmission data as multi-carrier data distributed into a plurality of sub-carriers. By using the OFDM modulation system, radio transmission of a large amount of data can be conducted efficiently.

When testing a receiving apparatus for receiving such an OFDM signal, an appropriate random bit sequence was inputted to a transmission data input portion of a transmitting apparatus for transmitting an OFDM signal. An OFDM modulated signal was thus generated. The receiving apparatus was made to receive a signal transmitted from this transmitting apparatus for the purpose of testing. Also when testing a transmitting system of a communication terminal having a function of transmitting a OFDM modulated signal, data of an appropriate random bit sequence were inputted to the communication terminal and thus an OFDM modulated signal was generated.

If the above described random bit sequence for testing was inputted to an inverse fast Fourier transform (IFFT) circuit serving as an OFDM signal generation means to generate an OFDM signal, the generated OFDM modulated signal looked like just a random noise when viewed in the time axis direction. Even when viewed in the frequency axis direction, it was difficult to determine whether an OFDM modulated signal was outputted correctly. It was thus difficult to determine from the conventional states of test signals whether or not a correct processing was conducted. FIG. 1 is a diagram showing an example of a conventional test signal. In FIG. 1, FIG. 1A is a diagram showing a waveform when viewed in the frequency axis direction, while FIG. 1B, is a diagram showing a baseband waveform when viewed in the time axis direction. It is difficult to grasp the state from only these waveforms.

Furthermore, when a test is conducted by inputting an OFDM modulated signal to a receiving apparatus, it was especially difficult to determine whether or not a fast Fourier transform (FFT) circuit for transforming the frequency axis of an OFDM signal to its time axis was functioning normally.

In addition, in the case where an OFDM modulated signal was generated by inputting a random bit sequence to the IFFT circuit, there was a possibility that phases of sub-carriers were aligned if processing was conducted without considering phases of the sub-carriers. When the waveform was observed on the time axis in such a case, an extremely large peak was observed and the signal was distorted due to exceeding the dynamic range of a modulator. FIG. 2 shows an example of such a case. In FIG. 2, FIG. 2A is a diagram showing a waveform when viewed in the frequency axis direction. FIG. 2B is a diagram showing a baseband waveform when viewed in the time axis direction. Even if there is no abnormality when viewed in the frequency axis direction, an extremely large peak waveform might appear when viewed in the time axis direction. Such an abnormal state is not desirable in testing.

SUMMARY OF THE INVENTION

An object of the present invention is to make it possible to favorably test the transmitting apparatus and the receiving apparatus using an OFDM modulated signal.

In order to solve this problem, an OFDM signal generation method of the present invention includes the steps of converting time axis representation of predetermined input data to frequency axis representation thereof at every predetermined unit by using the inverse Fourier transform and thereby generating an OFDM signal using a plurality of sub-carriers; and stopping output of an arbitrary sub-carrier included in a plurality of sub-carriers forming the OFDM signal in response to a predetermined command.

According to the OFDM signal generation method of the present invention, an OFDM signal having an arbitrary number of sub-carriers can be generated.

Furthermore, an OFDM signal generation apparatus of the present invention includes a conversion means for converting time axis representation of predetermined input data to frequency axis representation thereof at every predetermined unit by using the inverse Fourier transform, thereby generating an OFDM signal using a plurality of sub-carriers; and a control means for stopping output of an arbitrary sub-carrier included in a plurality of sub-carriers forming the OFDM signal to be converted by the conversion means , in response to a predetermined command.

According to the OFDM signal generation apparatus of the present invention, an OFDM signal having an arbitrary number of sub-carriers can be generated by the conversion means on the basis of a command given to the control means.

BRIEF DESCRIPTION OF THE DRAWINGS

Figures 4A, 4B:
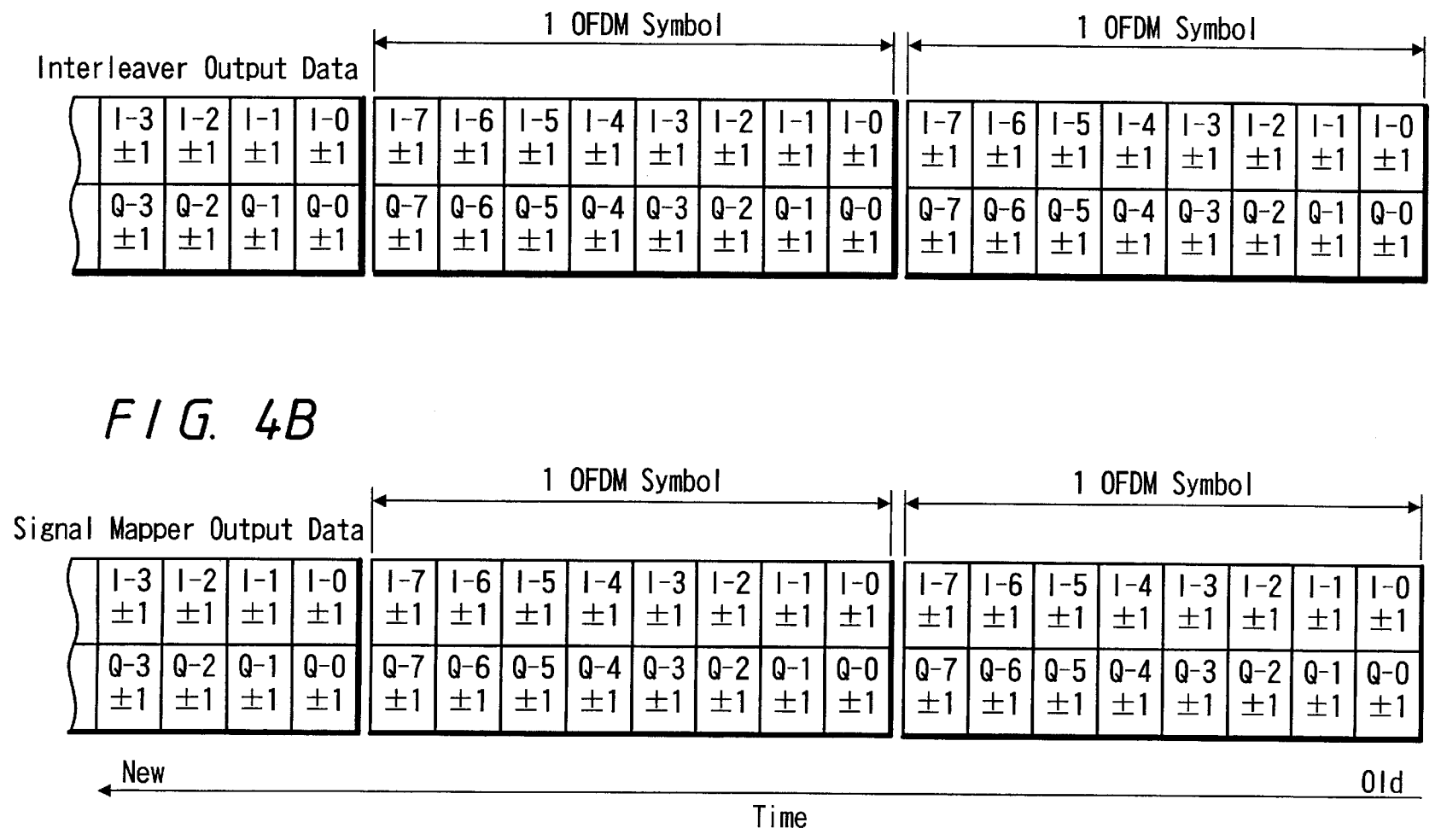

FIG. 4 is a diagram showing an example of an input signal to an IFFT circuit according to the first embodiment of the present invention;

FIG. 5 is a diagram showing an example of an input signal to an IFFT circuit in a test mode according to the first embodiment of the present invention;

DETAILED DESCRIPTION OF THE PREFERRED EMBODIMENT

Hereafter, a first embodiment of the present invention will be described by referring to FIGS. 3 to 6.

Figure 3:
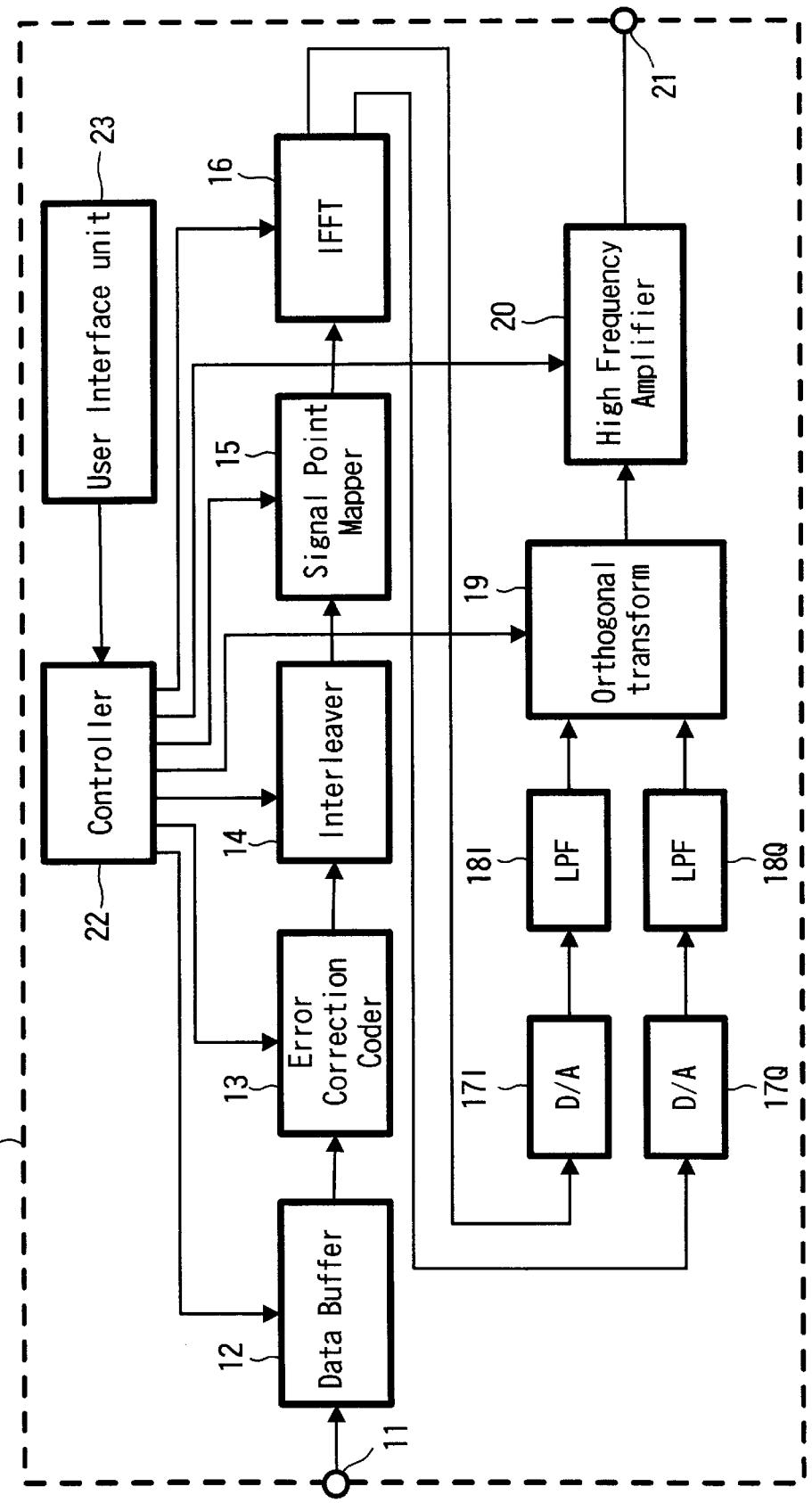
FIG. 3 is a block diagram showing an example of an OFDM modulated signal generating apparatus according to a first embodiment of the present invention.

FIG. 3 is a diagram showing the configuration of an OFDM signal generation apparatus 10 of the present embodiment. A sequence of data inputted from a data input terminal 11 or a sequence of data prepared beforehand and supplied from a controller 22 (this sequence of data may be data supplied from a pseudo data generator such as a PN code generator) is supplied to an error correction coder 13 via a data buffer 12. After being subjected to coding processing for error correction, the sequence of data is supplied to an interleaver 14, and subjected to processing of changing its arrangement at random for interleaving.

As for the data interleaved by the interleaver 14, as many data as determined by the number of sub-carriers of the OFDM signal and the modulation system are outputted in the lump as parallel data, and supplied to a signal point mapper 15. This signal point mapper 15 outputs data corresponding to an I component and a Q component of a modulation system used here, and supplies the data to an inverse fast Fourier transform circuit (hereafter referred to as IFFT circuit) 16 for conducting complex computation. For example, if the number of sub-carriers is 8 and the modulation system is the QPSK modulation system, 16 data correspond to one OFDM symbol. Therefore, the interleaver 14 outputs 16 data in the lump. The signal point mapper 15 calculates a signal point of the QPSK modulation from two data, and supplies 8 sets of data to the IFFT circuit 16. The IFFT circuit 16 generates a baseband OFDM signal having an I component and a Q component corresponding to 8 QPSK sub-carriers.

The IFFT circuit 16 conducts inverse Fourier transform collectively on a block containing a necessary number of data, and outputs its result. A transform output of an I component and a transform output of a Q component from the IFFT circuit 16 are supplied to respective digital-analog converters 17I and 17Q, and converted to analog signals therein. Thereafter, unnecessary components are removed from the resultant analog signals in low-pass filters 18I and 18Q. Outputs of the low-pass filters 18I and 18Q are supplied to an orthogonal modulator 19, and subjected to frequency conversion and orthogonal modulation. An output of the orthogonal modulator 19 is adjusted in output level by a high frequency amplifier 20, and then supplied to an output terminal 21. The signal obtained at the output terminal 21 is supplied directly to a receiving apparatus to be tested (not illustrated). Or the signal obtained at the output terminal 21 is radio-transmitted from a connected antenna (not illustrated) and received by a receiving apparatus to be tested.

Processing at each unit in this OFDM signal generation apparatus 10 is executed under the control of the controller 22 serving as the system controller. This controller 22 is connected with a user interface unit 23. Various commands (such as a mode setting command) or the like generated by user's key operation or the like are supplied to the controller 22. According to the set mode, the controller 22 can control various components or units suitably. To be concrete, the error correction system, the modulation system, the number of sub-carriers, the output frequency, and the output level are controlled by the controller 22. Parameters thereof can be adjusted by an input to the user interface unit 23.

Figure 1:
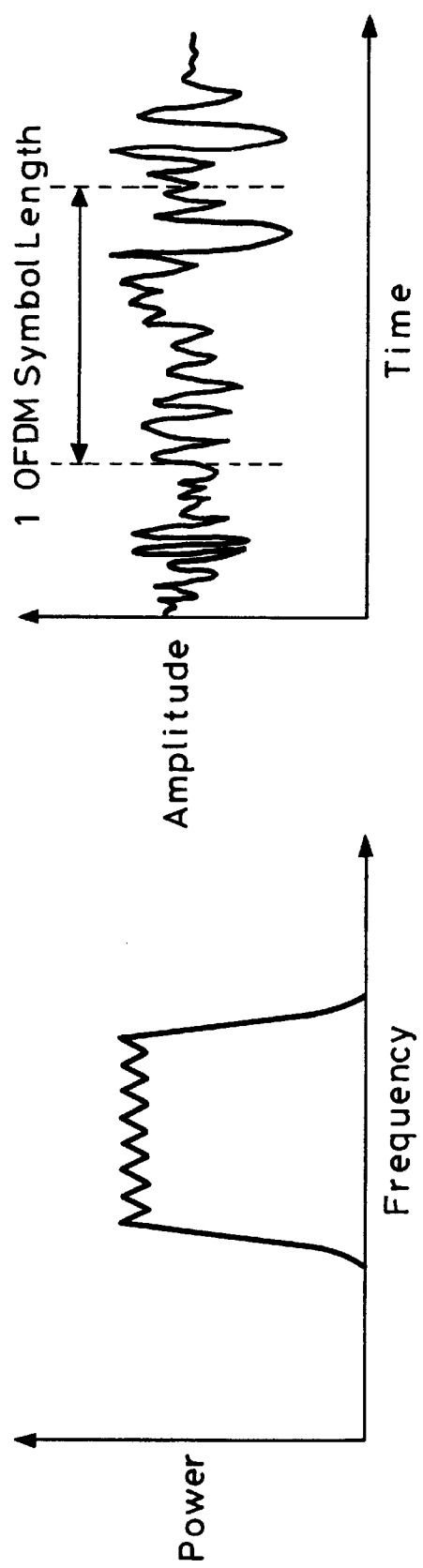
FIG. 1 is a waveform diagram showing an example of an OFDM modulated signal (an example of an ordinary signal)
Figure 2:
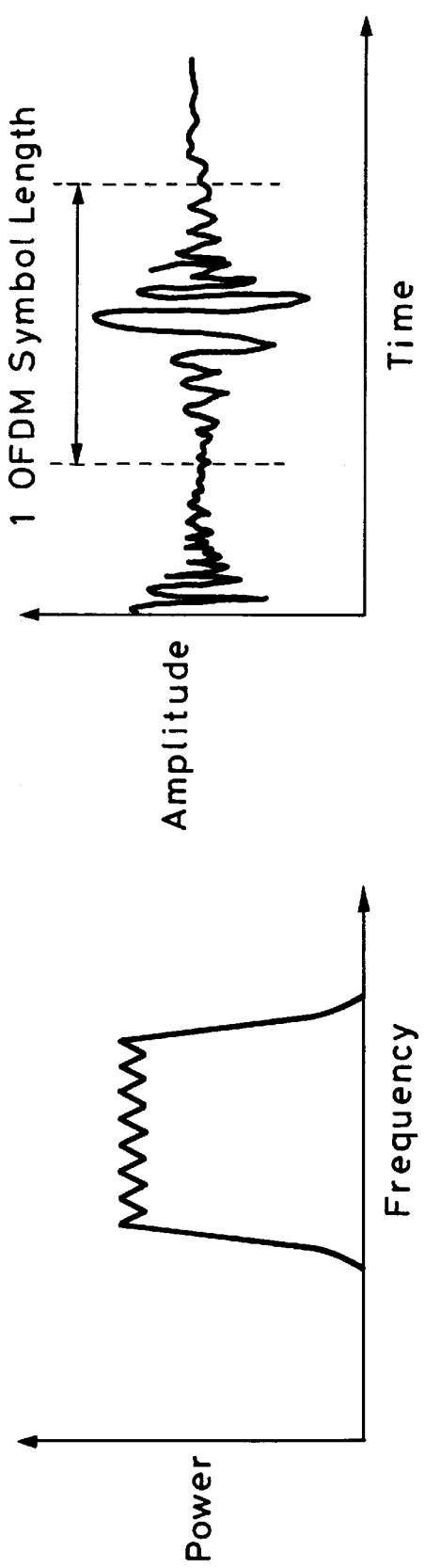
FIG. 2 is a waveform diagram showing an example of an OFDM modulated signal (an example in which phases of specific sub-carriers align)

Processing states in the OFDM signal generation apparatus 10 of the present embodiment will be now described. It is now assumed that modulated data is +1 or −1, and 0 is defined as a null symbol. As for the data structure, the case where the number of sub-carriers is 8 and the modulation system is the QPSK modulation system will be described as an example. First of all, in the case where a sequence of data obtained at the data input terminal 11 is processed without setting a test mode (i.e., with an ordinary communication processing mode being set), an output of the interleaver 14 becomes, for example, a state shown in FIG. 4A and an output of the signal point mapper 25 becomes, for example, a state shown FIG. 4B. As for the waveform of the signal subjected to the ordinary processing, waveforms shown in FIG. 1A and 1B already described with reference to the conventional technique are obtained.

In the present embodiment, control for a test signal is effected when the controller 22 has set the test mode in response to a command generated by, for example, key operation to the user interface unit 23. To be concrete, for example, the output state of the interleaver 14 and the operation state of the signal point mapper 15 are set for testing. Furthermore, it is made possible to set the number of sub-carriers by specifying whether the sub-carrier signals should be in the on state or in the off state, one by one. In addition, when the test mode is set, the signal point mapper 15 sets phases of the sub-carriers comparatively at random under the control of the controller 22.

Figures 5A, 5B:
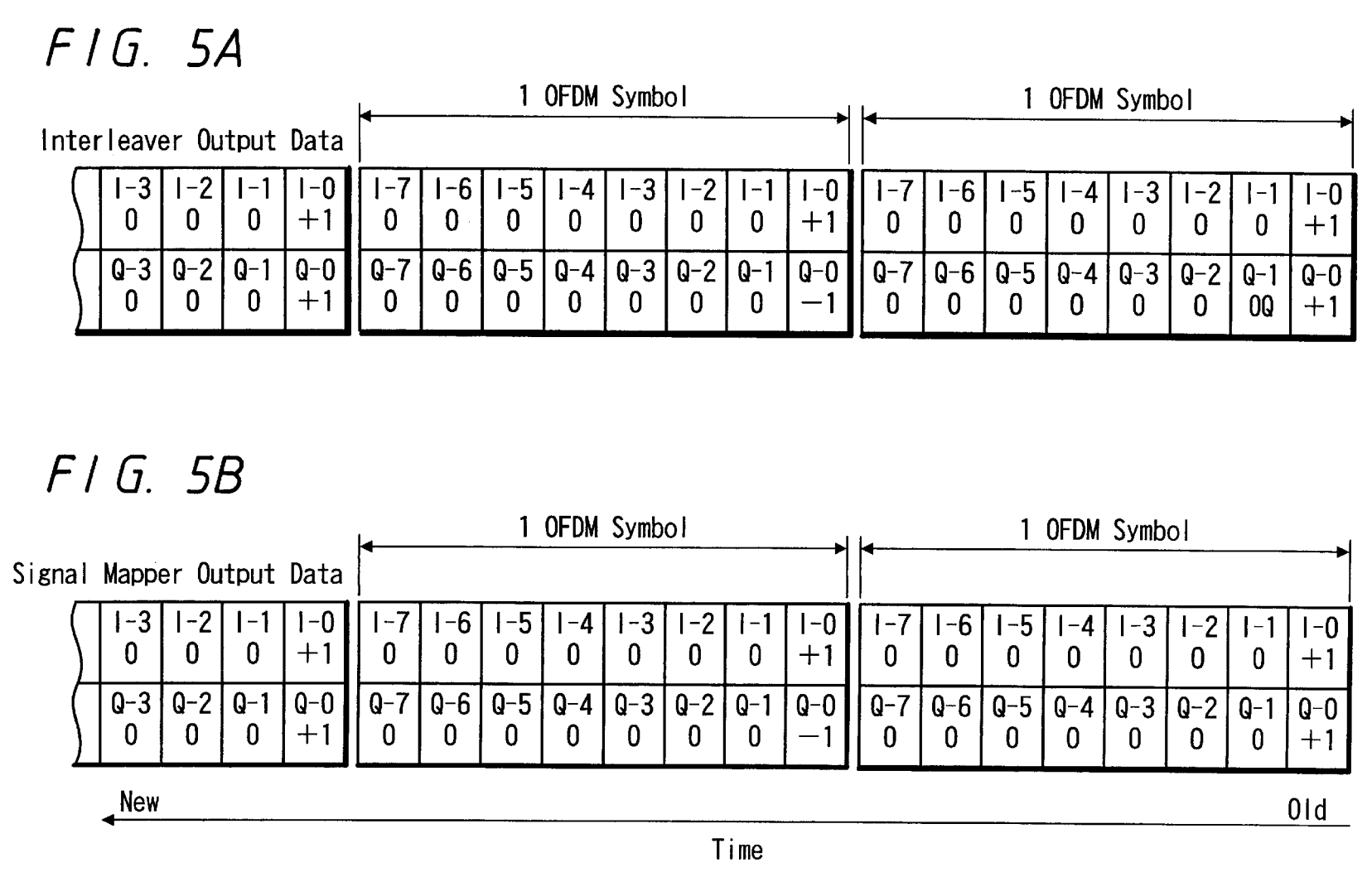

FIG. 5A shows the output of the interleaver 14 when the test mode is set. In this example, only a first sub-carrier has been specified to be in the on-state by the user's operation. Only I-0 and Q-0 portions corresponding to the first sub-carrier become data of +1 or −1 and are outputted from the interleaver 14 in this example. Into other data, null symbols are inserted. As for the output of the signal mapper 15 as well, only I-0 and Q-0 portions corresponding to the first sub-carrier become data of +1 or −1 and null symbols are inserted into other data as shown in FIG. 5B. Data shown in FIG. 5B is supplied to the IFFT circuit 16. As a result, an OFDM signal for testing in which only one sub-carrier has been placed is obtained.

Figure 6A:
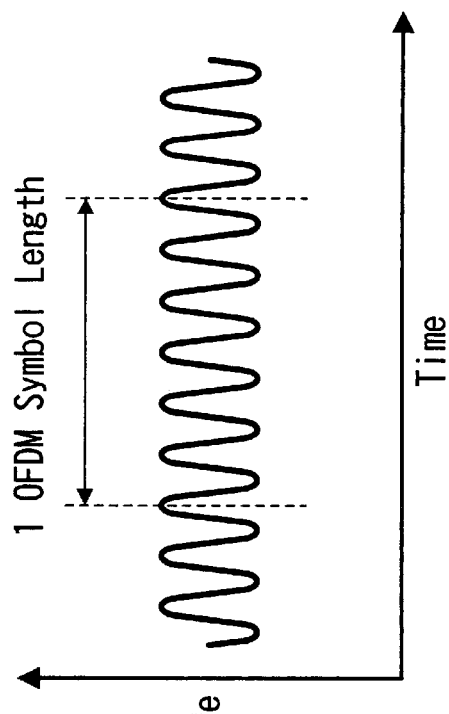
FIG. 6 is a waveform diagram showing a characteristic of an OFDM modulated signal in the test mode according to the first embodiment of the present invention.
Figure 6B:
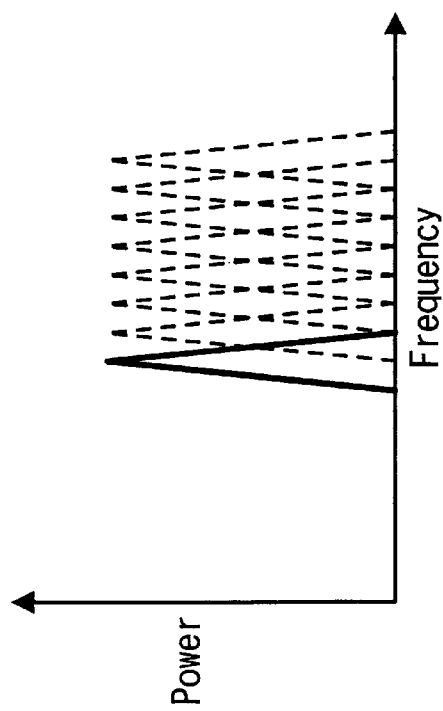

FIG. 6 is a waveform diagram showing the state of this OFDM signal for testing in which only one sub-carrier has been placed. As shown in FIG. 6A, only a waveform corresponding to a sub-carrier represented by a solid line is observed when viewed in the frequency axis direction. The sub-carriers having null symbols inserted therein as represented by broken lines do not appear in the waveform. When viewed in the the time axis direction, a signal of a constant state (sine waveform) is observed as shown in FIG. 6B.

When viewed in frequency spectrum, only one sub-carrier can be thus observed. When viewed in the time axis direction, a sine wave is observed. A signal having such regularity is thus obtained. When this signal is inputted to an OFDM signal receiving apparatus having unknown characteristics in order to verify its operation, therefore, it becomes possible to verify the dynamic range of a receiving portion, a frequency shift, operation of an FFT circuit included in the receiving portion and so on. If the operation of the FFT circuit included in the receiving portion is normal, the same output as the output of the signal point mapper 15 shown in FIG. 6B is outputted from the FFT circuit.

At the time of the test mode, the signal point mapper 15 sets phases of sub-carriers comparatively at random. As a result, generation of an OFDM signal having aligned phases of sub-carriers with each other can be prevented.

Furthermore, since the sub-carriers can be controlled so as to be in the on-state or off-state one by one, it is possible to generate such an OFDM modulated signal that intervals of disposition of sub-carriers are thinned. A test using an OFDM modulated signal having a special configuration can also be conducted favorably.

In the case where it is necessary to output a windowed temporal waveform as the OFDM modulated signal, there may be used such a configuration that a temporal waveform multiplication circuit is provided in a stage subsequent to the IFFT circuit 16 to conduct corresponding processing.

Figure 7:
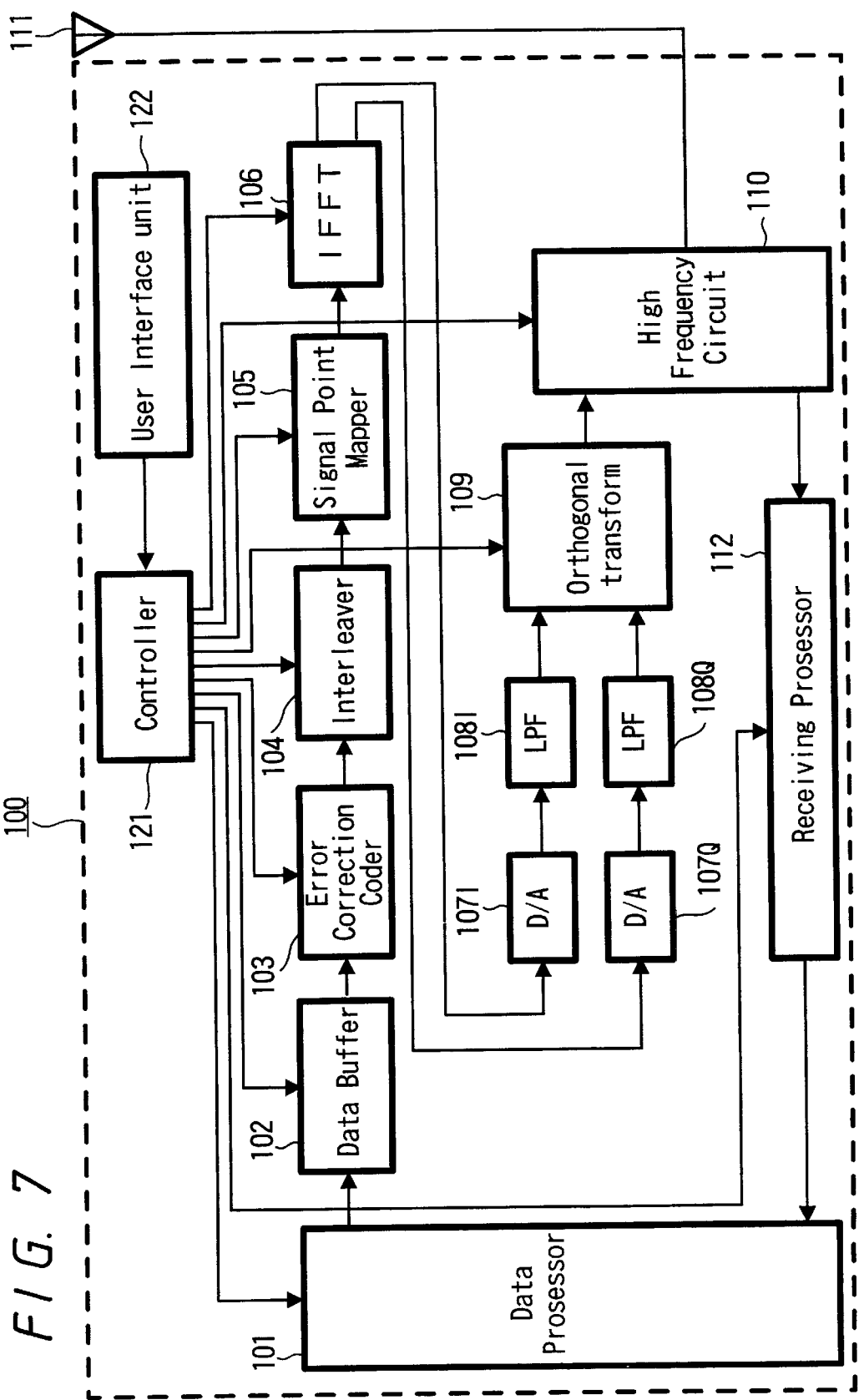
FIG. 7 is a block diagram showing an example of an OFDM modulated signal generating apparatus according to a second embodiment of the present invention.

A second embodiment of the present invention will be now described by referring to FIG. 7. In this embodiment, a configuration functioning in the test mode is incorporated in a terminal device for transmitting and receiving OFDM signals. FIG. 7 is a diagram showing the configuration of a terminal device 100. A sequence of transmission data (which may be pseudo data such as a PN code or the like at the time of the test mode) generated by a data processor 101 is supplied to a error correction coder 103 via a data buffer 102, subjected therein to coding processing for error correction, then supplied to an interleaver 104, and subjected therein to processing of changing the arrangement at random for interleaving.

As for the data interleaved by the interleaver 104, as many data as determined by the number of sub-carriers of the OFDM signal and the modulation system are outputted in the lump as parallel data, and supplied to a signal point mapper 105. This signal point mapper 105 outputs data corresponding to an I component and a Q component of a modulation system used here, and supplies the output data to an inverse fast Fourier transform circuit (IFFT circuit) 106 for conducting complex computation.

The IFFT circuit 106 conducts inverse Fourier transform collectively on a block containing a necessary number of data, and outputs its result. A transform output of an I component and a transform output of a Q component from the IFFT circuit 106 are supplied to respective digital-analog converters 107I and 107Q, and converted to analog signals therein. Thereafter, unnecessary components are removed from the resultant analog signals in low-pass filters 108I and 108Q. Outputs of the low-pass filters 108I and 108Q are supplied to an orthogonal modulator 109, and subjected to frequency conversion and orthogonal modulation. An output of the orthogonal modulator 109 is supplied to a high frequency circuit 110, subjected therein to high frequency processing for transmission, and radio-transmitted from an antenna 111 connected to the high frequency circuit 110. The configuration and operation of this transmission system ranging from the data buffer 102 to the orthogonal modulator 109 are basically the same as the configuration and operation of the OFDM signal generation apparatus 10 ranging from the data buffer 12 to the orthogonal modulator 19 described with reference to the first embodiment.

And a receiving processor 112 is connected to the high frequency circuit 110. Receiving processing of an OFDM modulated signal received by the antenna 111 is conducted by the receiving processor 112. The received data is supplied to the data processor 101. Although details of the receiving processor 112 are omitted here, the OFDM modulated signal is processed in, for example, an orthogonal demodulator, a low-pass filter, an analog-digital converter, a complex FFT circuit, a phase decision unit, a de-interleaver, a Viterbi decoder, a data buffer, and so on in the cited order.

Processing in each unit or component in this terminal device 100 is executed under control of a controller 121 serving as a system controller. This controller 121 is connected with a user interface unit 122. Various commands (such as a mode setting command) or the like generated by user's key operation or the like are supplied to the controller 121. According to the set mode, the controller 121 can control various components suitably. To be concrete, when an ordinary operation mode is set, it is made possible to process a sequence of data outputted from the data processor 101 suitably according to a predetermined system, generate an OFDM modulated signal, and conduct radio transmission of the OFDM modulated signal. When a test mode is set, the error correction system, modulation system, the number of sub-carriers, output frequency, and output level are controlled by the controller 22 so as to be in states for testing, and parameters thereof can be adjusted by input to the user interface unit 23. If the terminal device 100 is, for example, a radio telephone terminal, then a microphone and a speaker are connected to the data processor 101, and voice processing for call is conducted.

Owing to such a configuration, an OFDM modulated signal based upon data, for example, as shown in FIG. 4 is generated in the ordinary transmission mode, whereas an OFDM modulated signal based upon data, for example, as shown in FIG. 5 is generated in the test mode, in the same way as the first embodiment. In this way, both the ordinary transmission processing and the test processing in the test mode can be conducted favorably.

Furthermore, in the case where the terminal device 100 has such a configuration, it is also possible to simply check the receiving processing state of an OFDM modulated signal in the receiving processor 112 included in the terminal device 100 by folding back an OFDM modulated signal for testing at the high frequency circuit 110 toward the receiving processor 112.

In the above described embodiment, multi-value modulation of at least QPSK modulation is supposed. As a result, the IFFT circuit conducts complex computation, and a signal point mapper is provided. By using BPSK modulation or the like, however, it is a matter of course that such a configuration that an IFFT circuit handling only real number data is provided and the signal point mapper is eliminated may be employed. Multi-value modulation other than QPSK modulation, such as QAM modulation, may also be used.

According to an OFDM signal generation method stated in claim 1, an OFDM signal having an arbitrary number of sub-carriers can be generated on the basis of a predetermined command, and various tests, such as the transmission path state and receiver characteristics measurement or the like, using an OFDM signal having an arbitrary number of sub-carriers can be conducted easily.

According to an OFDM signal generation method stated in claim 2, in the OFDM signal generation method stated in claim 1, phases of the plurality of sub-carriers forming the OFDM signal are set so as to be random with each other. As a result, a signal capable of measuring the characteristics and the like favorably can be generated.

According to an OFDM signal generation method stated in claim 3, the OFDM signal generation method stated in claim 1 includes the steps of: providing an ordinary communication mode and a test mode; in response to the communication mode being set, conducting the inverse Fourier transform on generated transmission data, and transmitting resultant data; and in response to the test mode being set, stopping output of arbitrary sub-carriers, in processing of a sequence of bits to be subjected to the inverse Fourier transform, generating an OFDM signal for testing, and transmitting the OFDM signal. As a result, both the ordinary communication processing and the processing for testing become possible.

According to an OFDM signal generation method stated in claim 4, in the OFDM signal generation method stated in claim 3, phases of the plurality of sub-carriers forming the OFDM signal for testing are set so as to be random with each other. As a result, at the time of the test mode, a signal capable of measuring the characteristics and the like favorably can be generated.

According to an OFDM signal generation apparatus stated in claim 5, there is obtained such an apparatus that an OFDM signal having an arbitrary number of sub-carriers can be generated by the conversion means on the basis of a predetermined command supplied to the control means and various tests, such as the transmission path state and receiver characteristics measurement, using an OFDM signal having an arbitrary number of sub-carriers can be conducted easily.

According to an OFDM signal generation apparatus stated in claim 6, in the OFDM signal generation apparatus stated in claim 5, there is effected by the control means control for setting phases of the plurality of sub-carriers forming the OFDM signal to be converted by the conversion means, so as to be random with each other. As a result, a signal capable of measuring the characteristics and the like favorably can be generated easily.

According to an OFDM signal generation apparatus stated in claim 4, in the OFDM signal generation apparatus stated in claim 5, an ordinary communication mode and a test mode can be set under the control of the control means; when the communication mode is set, the control means effects control for conducting the inverse Fourier transform on generated transmission data in the conversion means, and transmitting resultant data; and when the test mode is set, the control means effects control for stopping output of arbitrary sub-carriers, in processing of a sequence of bits to be subjected to the inverse Fourier transform, and generating an OFDM signal for testing. As a result, both the transmission processing using an OFDM signal and the transmission processing using an ordinary OFDM signal for testing can be conducted easily.

According to an OFDM signal generation apparatus stated in claim 6, in the OFDM signal generation apparatus stated in claim 4, the control means effects control for setting phases of the plurality of sub-carriers forming the testing OFDM signal generated when the test mode is set, so as to be random with each other. As a result, a signal capable of measuring the characteristics and the like favorably at the time of test mode can be generated easily.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An OFDM signal generation method comprising the steps of:
   converting a time axis representation of predetermined input data to a frequency axis representation thereof at every predetermined unit by using an inverse Fourier transform and generating an OFDM signal from the converted input data using a plurality of sub-carriers;
   stopping output of arbitrary sub-carriers included in the plurality of sub-carriers forming the OFDM signal in response to a predetermined command;
   setting at least one of an ordinary communication mode and a test mode;
   in response to the communication mode being set, conducting the inverse Fourier transform on generated transmission data and transmitting resultant transformed data; and
   in response to the test mode being set, stopping output of arbitrary sub-carriers, processing a sequence of bits to be subjected to the inverse Fourier transform by generating an OFDM signal for testing, and transmitting the OFDM signal.

2. An OFDM signal generation method according to claim 1, comprising the step of:
   setting phases of the plurality of sub-carriers forming the OFDM signal so as to be random with each other.

3. The OFDM signal generation method according to claim 1, comprising the further step of:
   setting phases of the plurality of sub-carriers forming the OFDM signal for testing so as to be random relative to each other.

4. An OFDM signal generation apparatus comprising:
   conversion means for converting a time axis representation of predetermined input data to a frequency axis representation thereof at every predetermined unit by using an inverse Fourier transform and for generating an OFDM signal using a plurality of sub-carriers; and
   control means for stopping output of arbitrary sub-carriers included in the plurality of sub-carriers forming the OFDM signal for conversion by the conversion means in response to a predetermined command, wherein
   an ordinary communication mode and a test mode are set under control of the control means;
   wherein, when the communication mode is set, the control means effects control for conducting the inverse Fourier transform on generated transmission data in the conversion means and transmits resultant converted data; and
   wherein, when the test mode is set, the control means effects control for stopping output of the arbitrary sub-carriers during processing of a sequence of bits to be subjected to the inverse Fourier transform and generates an OFDM signal for testing.

5. An OFDM signal generation apparatus according to claim 4, wherein the control means effects control for setting phases of the plurality of sub-carriers forming the OFDM signal to be converted by the conversion means so as to be random with each other.

6. The OFDM signal generation apparatus according to claim 4, wherein the control means effects control for setting phases of the plurality of sub-carriers forming the testing OFDM signal generated when the test mode is set, so as to be random relative to each other.

* * * * *